(12) United States Patent
Franceschini et al.

(10) Patent No.: US 8,717,185 B2
(45) Date of Patent: May 6, 2014

(54) WARNING AND PREPARATORY SYSTEM FOR A PORTABLE DEVICE

(71) Applicant: BlackBerry Limited, Waterloo (CA)

(72) Inventors: Vincent Jean-François Franceschini, Conestoga (CA); Alexander John Ogle, Waterloo (CA)

(73) Assignee: Blackberry Limited, Waterloo (CA)

( * ) Notice: Subject to any disclaimer, the term of this patent is extended or adjusted under 35 U.S.C. 154(b) by 0 days.

(21) Appl. No.: 14/048,661

(22) Filed: Oct. 8, 2013

(65) Prior Publication Data

US 2014/0038676 A1    Feb. 6, 2014

Related U.S. Application Data

(62) Division of application No. 12/842,393, filed on Jul. 23, 2010, now Pat. No. 8,581,735.

(51) Int. Cl.
*G08B 17/10* (2006.01)

(52) U.S. Cl.
USPC ........ 340/635; 340/540; 340/541; 340/568.1; 340/686.1; 705/39; 705/44; 705/64

(58) Field of Classification Search
CPC ...................................... G06F 11/00
USPC .......... 340/635, 540, 541, 568.1, 571, 686.1; 705/39, 44, 64
See application file for complete search history.

(56) References Cited

U.S. PATENT DOCUMENTS 5,539,876 A * 7/1996 Saito et al. ............... 714/14
5,956,626 A   9/1999 Kaschke et al.
6,003,008 A   12/1999 Postrel et al.
6,304,454 B1  10/2001 Akamatsu et al.
7,304,588 B2  12/2007 Ingalsbe et al.
7,519,388 B2  4/2009 Vander Veen et al.
7,536,562 B2  5/2009 Little et al.
7,555,326 B2  6/2009 Infanti
7,747,007 B2  6/2010 Hyun et al.
2002/0139822 A1  10/2002 Infanti
2007/0009247 A1  1/2007 Maeda et al.
2007/0123324 A1  5/2007 Sato et al.
2008/0012706 A1  1/2008 Mak-Fan et al.
2008/0191892 A1  8/2008 Kirkup et al.
2010/0052660 A1  3/2010 Wang

FOREIGN PATENT DOCUMENTS

EP  1950763   7/2008
JP  08129531  5/1996

OTHER PUBLICATIONS

European Patent Office, Extended European Search Report for EP Patent App. No. 10170617.4, Dec. 23, 2010.
United States Patent and Trademark Office, Office Action for U.S. Appl. No. 12/842,393, Jan. 4, 2013.

(Continued)

*Primary Examiner* — Tai T Nguyen
(74) *Attorney, Agent, or Firm* — Borden Ladner Gervais LLP; Jeffrey W. Wong

(57) ABSTRACT

The disclosure is directed at a system and method for preparing a device for power loss when the presence of a component cover is not sensed. The system includes a component cover with a detection portion; a sensor adapted to detect the presence of the detection portion in the component cover; and a processor able to receive information from the sensor and to prepare the mobile device for power loss.

20 Claims, 7 Drawing Sheets

(56) References Cited

OTHER PUBLICATIONS

European Patent Office, Examination Report for EP Patent Appln No. 10170617.4, Jun. 17, 2013.

United States Patent and Trademark Office, Notice of Allowance for U.S. Appl. No. 12/842,393, Jul. 19, 2013.

\* cited by examiner

WARNING AND PREPARATORY SYSTEM FOR A PORTABLE DEVICE

CROSS-REFERENCE TO RELATED APPLICATIONS

This application is a division of U.S. patent application Ser. No. 12/842,393, filed Jul. 23, 2010, now U.S. Pat. No. 8,581,735, which is incorporated herein by reference.

FIELD

The present document relates generally to mobile communication devices. More particularly, the present document relates to a warning system and method for detection of the removal of a component cover from a portable device.

BACKGROUND

In recent years, use of portable devices has continued to increase and there is a higher dependency on these devices for communication or other functionality. Many of these devices, such as portable computers, portable DVD players, handheld mobile phones, and accessories to these devices, often require a power source, such as a battery for operation. Many times these batteries are included in a compartment, which is protected under a component cover. If the component cover is removed, the battery or other removable components within the compartment may become disengaged or dislodged. The mobile device may then experience a sudden and unexpected loss of power that can result in the loss of critical system and user data since the device is unable to properly shut down. While many mobile devices are programmed with an interrupt process only a small amount of mobile device critical information can be saved once power is loss.

Therefore, there is provided a warning system for detection of a mobile device component cover.

BRIEF DESCRIPTION OF THE DRAWINGS

Embodiments will now be described, by way of example only, with reference to the attached Figures, wherein:

FIG. 4 illustrates the warning and preparatory system of FIG. 3 with the component cover on;

DETAILED DESCRIPTION

Figure 1:
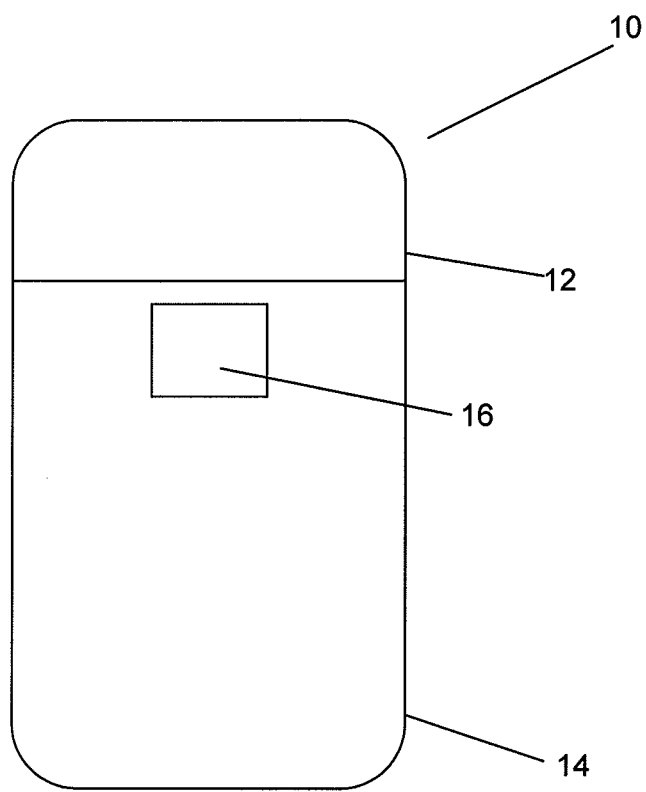
FIG. 1 is a schematic drawing of a back of a mobile communication device.

There is a need for a warning system that will detect the removal of a component cover from a mobile device, along with a method that assists in the proper shut down of the device, in order to save or protect critical data when the warning is initiated.

In one aspect, there is provided a warning and preparatory system for a mobile device comprising a component cover with a detection portion; a sensor adapted to detect the detection portion of the component cover; and a processor able to receive information from the sensor and trigger an operating system to prepare the mobile device for a power loss.

In another aspect, there is provided a warning and preparatory method for a mobile device comprising: sensing the removal of a component cover of the mobile device; having an operating system determine active applications; saving critical user and system data; and increasing a sampling rate of removable objects.

In one aspect, there is provided a warning and preparatory system for a mobile device comprising a component cover with a detection portion; a sensor adapted to detect the detection portion of the component cover; and a processor able to receive information from the sensor and to prepare the mobile device for power loss.

In another aspect, there is provided a warning and preparatory method for a mobile device comprising sensing removal of a component cover of the mobile device; determining active applications executing on the mobile device; saving critical user and system data; and increasing a sampling rate of removable objects.

There is provided a warning system and method such that on detection of the removal of the component cover, the mobile device is prepared, or primed, regarding the potential removal of a component so that the mobile device can prepare for this possible event. In one embodiment, the mobile device processor receives a signal indicating that the component cover is not present so that there is additional time to prime the mobile device before possible removal of the battery or other components such as a SIM card.

When a component, or compartment, cover becomes dislodged or disengaged there is a substantially increased likelihood of a critical component, like the battery, being removed from the mobile device. As mobile devices continue to have increased processing power, and users engage in more complex applications and operations on their mobile devices, there is a need to warn the mobile device of this potential loss of power as the residual power on battery removal is typically not sufficient to save critical user data or to commit volatile memory to non-volatile memory.

With the addition of a warning and preparatory system including a sensor that can detect the presence or removal of the component cover, the system may allow the mobile device more time to prime for the loss of power. Another advantage is that the processor and operating system of the mobile device may have the time to determine which applications are currently executing on the process and can save data, store the last state or operate the mobile device in safe mode until either the device loses power, engages a new power source or detects the presence of the component cover.

FIG. 1 illustrates a rear view of a mobile device 10 according to one embodiment. The mobile device has a back portion 12, which includes a component cover 14 that may be slideably connect to the back portion 12. Other connection methods are known in the art and may include a hinged connection or a depressible button connection.

The component cover 14 is used to cover a compartment within the device, which may be used to house critical device components such as but not limited to, a battery. The component cover 14 may be a typical battery door, covering either a single or multiple batteries, or may be a more complex cover that is designed to hide a SIM card or other removable objects like a Secure Digital (SD) card. The component cover 14 further includes a detection portion 16, which may be a metal or magnetized portion, or other material that may be sensed by a sensor. The detection portion 16 may be any shape such as in the shape of a logo or brand identifier of the mobile device or a mobile device manufacturer.

Figure 2:
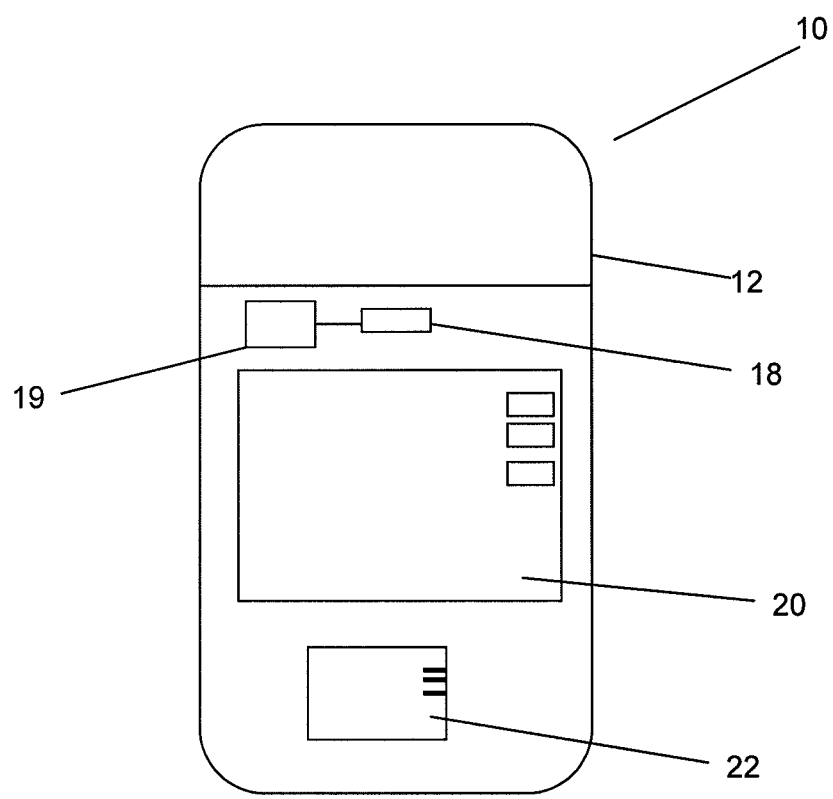
FIG. 2 shows the components of the back of a mobile device with the component cover removed.

FIG. 2 provides a rear view of the mobile device with the component cover removed. Typically, the component cover protects a battery 20, or multiple batteries and a SIM card 22 from being accidently dislodged or disengaged while in operation. A sensor 18 is located within the compartment or at a rear area of the mobile device. The sensor 18 may be fairly small or thin so that it may be incorporated within the available space at the rear of the mobile device 10 and is preferably located directly under the detection portion 16 when the component cover 14 is attached. Various other sensor locations are considered, as a stronger sensor may be able to detect the detection portion 16 from other locations, further removed from the detection portion 16. Alternatively, the sensor 18 may be hidden and may not be visible when the component cover 14 is removed, however, the sensor 18 can still sense the presence the detection portion 16 when the component cover 14 is in place.

Also, the mobile device 10 includes a processor 19, which controls operation of the mobile device 10 and communicates with the sensor 18 to determine if the detection portion 16 is sensed by the sensor 18.

It is the presence, or lack thereof, of the detection portion 16 that the sensor 18 detects. When the sensor 18 no longer detects the presence of the detection portion 16, the sensor 18 will relay that information to the processor 19, which can then initiate a process of preparing the mobile device 10 for a possible loss of power.

Figure 3:
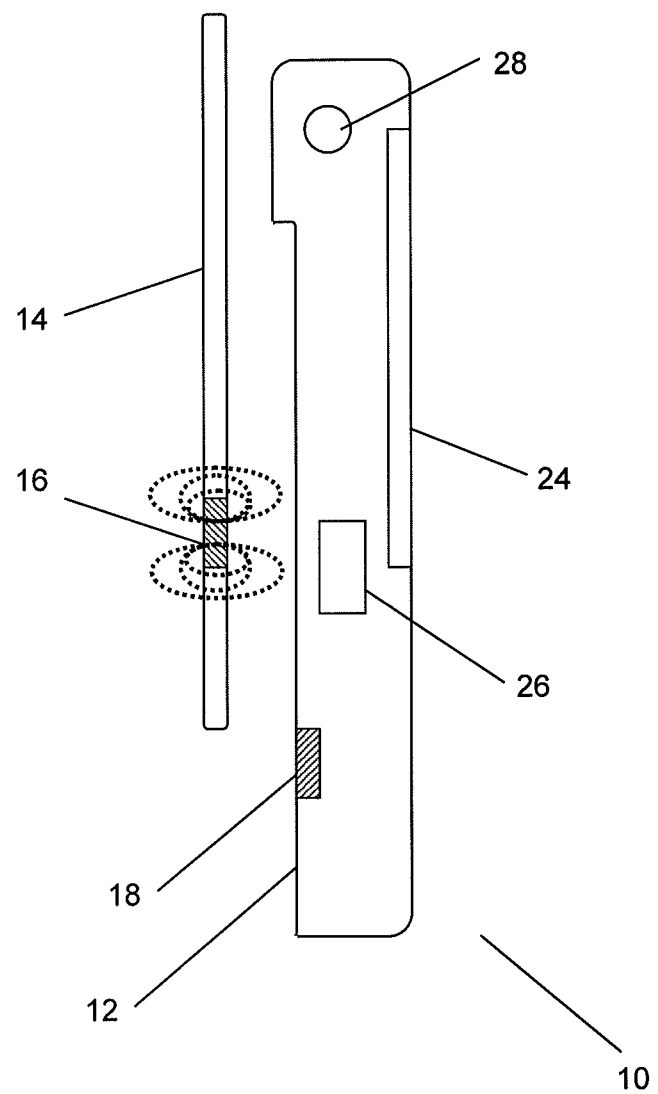
FIG. 3 illustrates a warning and preparatory system with the component cover partially off, according to one embodiment.
Figure 4:
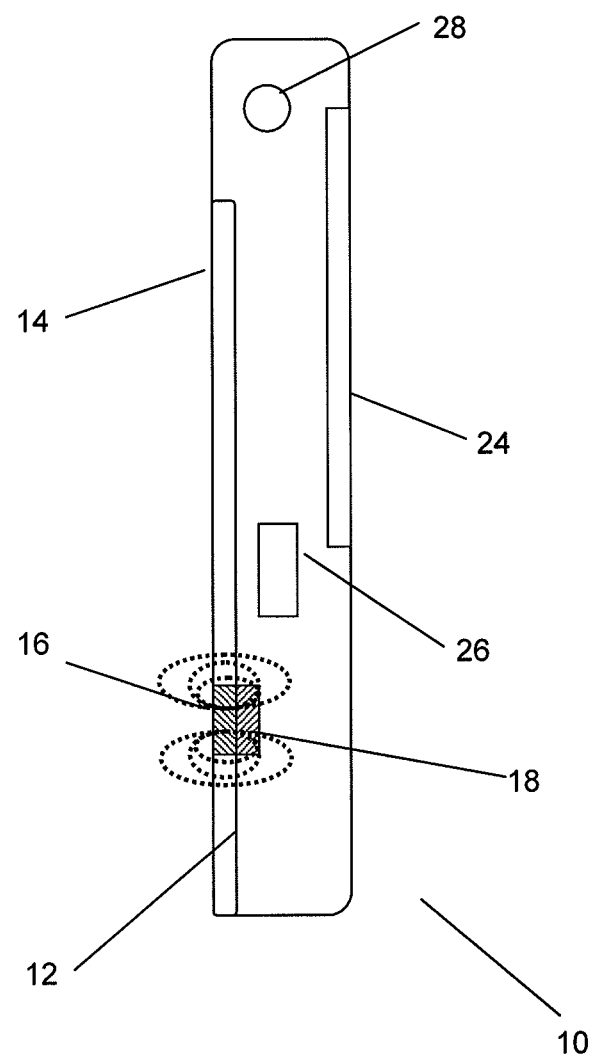

FIGS. 3 and 4 illustrate another embodiment of a warning and preparatory system. From these side views of the mobile device, other possible components like a display 24, an external button 26 and an earphone jack 28 are visible. In this embodiment, the detection portion 16 is made of a magnet although a metal or magnetized material can also be used. The magnet may be oriented with its north pole directed towards the back of the device, although the opposite orientation is contemplated. In this embodiment, the sensor 18 may be a proximity or Hall effect sensor, which would be able to detect the magnetic field produced by the magnet 16. The Hall effect sensor may be a passive sensor, allowing it to regularly check and provide a step signal change to the processor 19 when the magnetic flux passes a predetermined, or threshold, level.

When the component cover 14 is removed or slid away from the back of the mobile device 12, as in FIG. 3, the connection between the sensor 18 and the detection portion 16 is broken in that the sensor 18 is unable to detect the magnetic field being produced by the detection portion 16. The breaking of the connection causes the sensor 18 to relay this information to the processor 19, in the form of a signal representing a warning message. The connection between the sensor 18 and the processor 19 may be wired or wireless.

Once the processor receives the signal, the processor 19 may begin preparing the mobile device 10 for power loss as will be described in more detail below.

While the processor 19 is preparing the device 10, the sensor 18 may continue to check to determine whether the component cover 14 has been replaced, as in FIG. 4. If the sensor 18 detects the magnetic field created by the detection portion 16, the sensor 18 may relay this information to the processor 19 so that the processor 19 may terminate any preparatory steps that were being executed in anticipation of battery 20 or other component removal.

In an alternative embodiment, the detection portion 16 can be a speaker embedded within the component cover 14. The Hall effect sensor or proximity sensor 18 may detect the presence, or lack thereof, of the speaker in a similar fashion as is discussed and described above.

Figure 5:
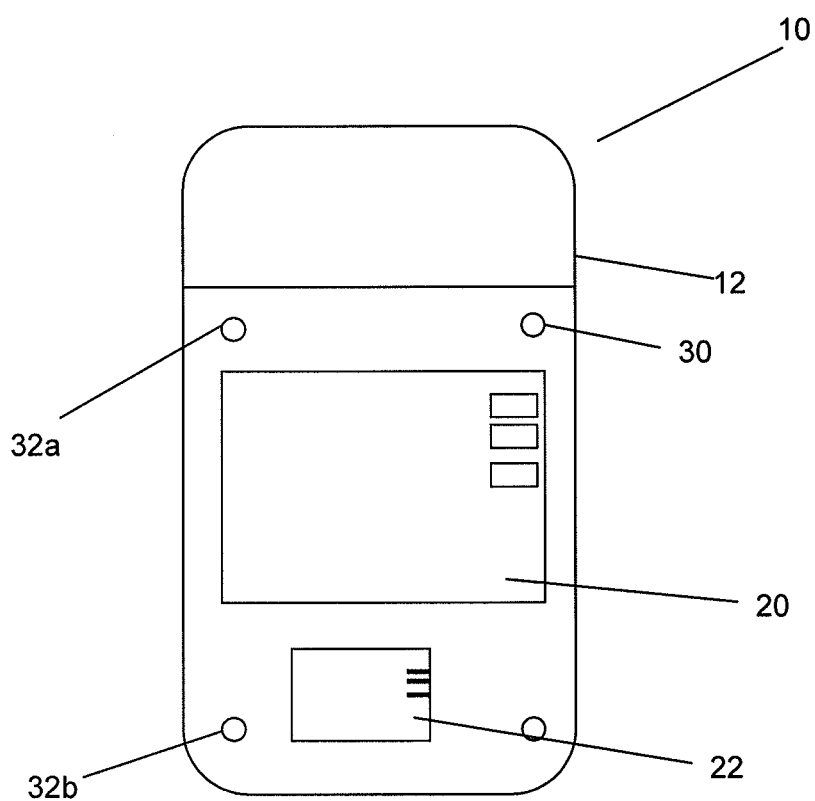
FIG. 5 illustrates a warning and preparatory system in an alternative embodiment.

In a further embodiment, as shown in FIG. 5, the detection portion 16 may extend to be the full component cover, in that the component cover may be made of metal, or other like material. In this embodiment, there may be sprung pins 32a and 32b at the rear 12 of the mobile device 10 that compress against the component cover (not shown). The sprung pins 32a and 32b may establish a connection between the metal component cover and the system ground of the mobile device 10 to prevent issues with the radio frequency performance.

In this embodiment, the sensor 30 may be an extra sprung pin or an altered existing sprung pin. This sensor pin 30 may be adapted to include a digital signal level that may be read by or transmitted to the processor 19. When the component cover is present, the sensor pin 30 is pulled to ground by the continuity through the component cover. When the component cover is removed, the sensor pin changes to a non-grounded state, which relays this information to the processor indicating that the component cover has been removed or in its expected location. Once the processor receives this information, the processor can prepare, or prime, the device for a possible loss of power.

The sensor pin 30, or any one of the sprung pins 32, may also be used to detect the removal of a component cover made of other material in the same manner; although, component covers of other material may not require sprung pins to prevent, or decrease issues with radio frequency performance.

Figure 6:
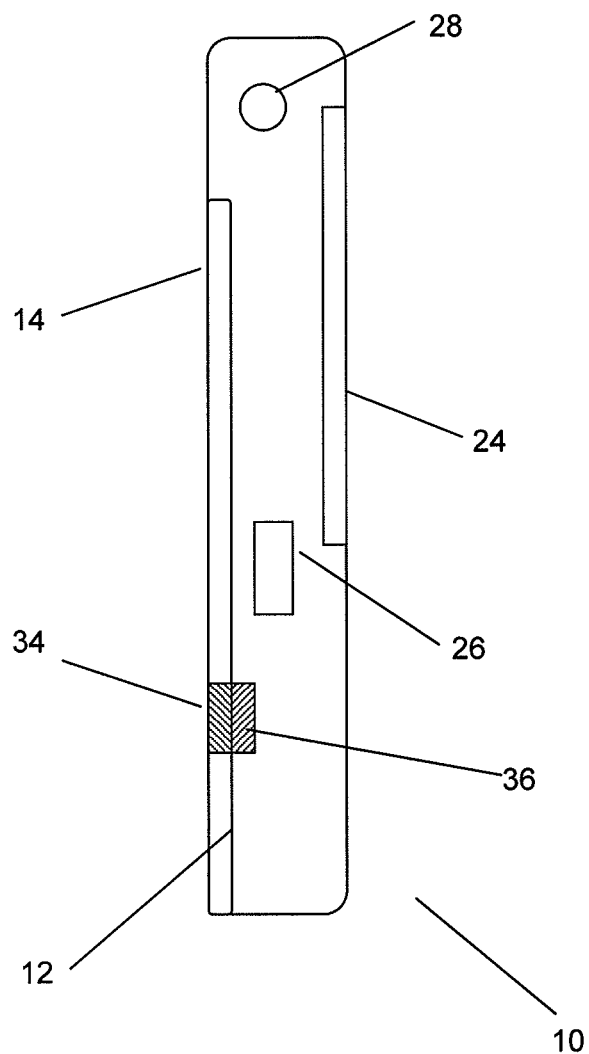
FIG. 6 illustrates a warning and preparatory system in another alternative embodiment.

FIG. 6 illustrates a further embodiment of a warning and preparatory system for a mobile device. Similar to FIG. 4, FIG. 6 illustrates a side view of the mobile device 10 outlining the back of the device 12 and a component cover 14. The mobile device may further a display 24, buttons 26 and earphone jack 28. Other mobile device components may also be included but are not shown. In this embodiment, a radio frequency identification ("RFID") tag 34 may be housed within or on a surface of the component cover. Preferably, the RFID tag 34 is a passive RFID tag, not requiring a separate power source but powered by the power source located within the mobile device. An RFID tag requiring a power source is contemplated, but a thicker or larger component cover 14 may be required in order to house this power source. The RFID tag 34 may further incorporate an antenna for sending and receiving signals.

In this embodiment, the warning and preparatory system further comprises an RFID sensor 36. The RFID sensor 36 detects the signal transmitted by the RFID tag 34. The RFID sensor 36 may be a passive sensor and may regularly check to determine whether there continues to be a signal from the RFID tag 34 and provide detection information to the processor 19 when the RF signal passes a predetermined or threshold level.

When the component cover 14 is removed and the RFID tag 34 is distanced from the RFID sensor 36, the RFID sensor 36 is able to detect this distancing through the RFID signals and relay to the processor 19 that that the signal from the RFID tag 34 is weakened or no longer being received. Once the processor receives this information, the processor 19 may begin preparing the mobile device 10 for power loss as will be described in more detail below. The RFID sensor 36 may continue to check for the RFID signal initiated from the RFID tag 34 to determine whether the component cover 14 has been replaced. If the RFID sensor 36 redetects the RFID signal, i.e. the component cover 14 has been replaced, the RFID sensor 36 may relay this information to the processor 19 so that the processor 19 may terminate any preparatory steps currently being undertaken.

Figure 7:
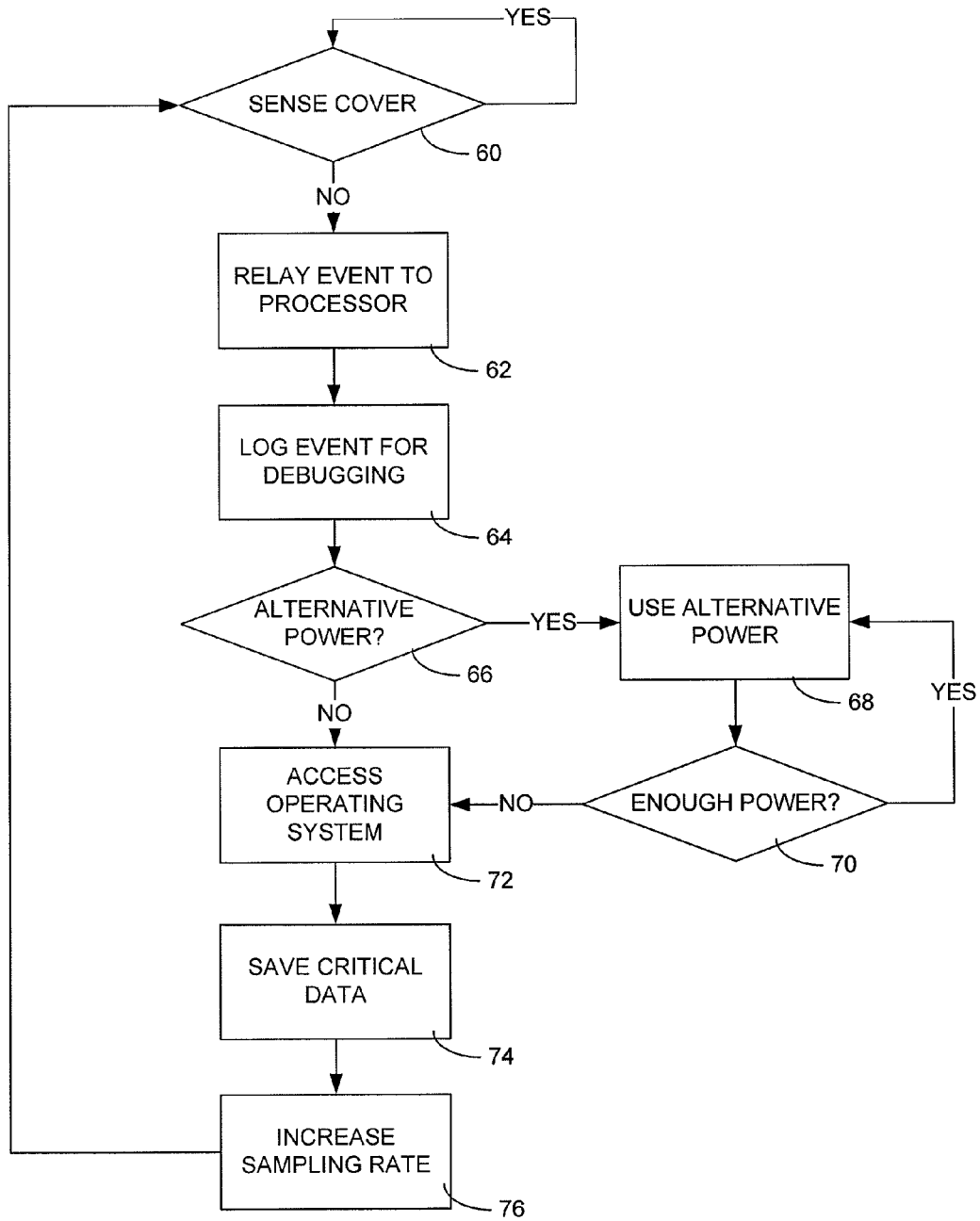
FIG. 7 illustrates in flow chart form the warning method according to one embodiment of the present invention.

FIG. 7 illustrates a flow-chart of a warning and preparatory method according to one embodiment. Firstly, the sensor checks for the detection portion at predetermined time intervals 60. For example, a Hall effect sensor may, at fixed or varying intervals, attempt to detect the presence of the magnetic field produced by a magnetic detection portion. Alternatively, a sprung pin may detect the presence or lack thereof of the component cover as it remains in a grounded state. If the sensor does not detect the presence of the compartment cover, it will relay this information to the processor 62. This detection of the removal of the component cover may be seen as a trigger event for proceeding with further aspects of the warning and preparatory method.

As an optional step, once the signal is received from the sensor, the processor may log 62 this event along with other device information for future debugging. As removal of the component cover tends to be an unusual event, it may be useful to have a record of the conditions surrounding the removal of the cover. This information logged might include, but is not limited to, time stamps, network state, battery capacity, memory use, active applications and a partial or total memory dump.

The processor then determines 66 if the mobile device has a secondary or alternative power source, for example, a second permanent or removal battery, or a wired connection to a wall outlet. If a secondary power supply is available, the processor may then choose to use this alternative power source 68 to power the device so that device data will not be lost due to an unexpected power failure. It may be necessary for the processor to first determine 70 if there is sufficient charge in the secondary power source to safely power the components of the device in the current set up. If there is sufficient charge, the power source may be switched to the secondary power source from the primary power source until either there is no longer sufficient power or until the sensor detects that the component cover is replaced. The check to determine if the component cover is present is continuously performed such that the re-detection of the component cover causes the warning and preparatory method to be stopped or ended. If it appears that the alternative power source does not have enough power to power the device, the processor may then continue the warning and preparatory method as if there was no alternative power source.

If there is no secondary power source or if there is insufficient charge in the secondary power source, the warning and preparatory method prepares the mobile device for the possible loss of power. After key information may be logged 64, the operating system is accessed 72, which may initiate further steps based on what applications are currently active. In one embodiment, the operating system can be accessed to determine which applications are currently executing on the device. Determination of the currently executing applications may include determine if they are high power or low power consuming applications. For example, if a video processing application is currently executing, the processor may pause that application to free up additional power for more critical processes. Other applications may be saved, paused, closed or ignored depending on how critical these applications are to the user and how much power they consume.

The warning and preparatory method may then commence the saving of critical data 74. Data that is critical to the mobile device or the user may be saved as well as volatile memory may be committed to non-volatile memory to prepare for the potential loss of power. The warning and preparatory method may also provide for committing any cached contents to non-volatile storage. The warning and preparatory method provides for the ability to have further data saved, as there is an advanced warning for the mobile device. The warning and preparatory method initiates the saving process, which may be accomplished prior to the battery being removed or dislodged. Critical user data may be saved as opposed to only saving critical mobile device system data. Pausing or terminating applications may provide the pre-programmed interrupt process with more power for its processes on power loss.

The warning and preparatory method also provides for an increased sampling rate to detect the removal of any other removable objects 76. Although this is shown near the end of the flow-chart, it would be understood by those skilled in the art that this may occur either after the data is saved or concurrently with other aspects of the method.

In one embodiment, the SIM card sampling rate may be increased to ensure it has not become dislodged or dislocated with the removal of the component cover. The increased sampling rate of the SIM card may ensure that any network activity is stopped as soon as the SIM card is removed and may prevent activity that cannot be billed accurately. Once the SIM card is removed, any calls or data sessions may be stopped and the radio signal disconnected from the network. The increased sampling rated may be advantageous in the absence of a switch to detect whether the SIM card is present.

Preparation for the removal of the SIM card is one of the steps the mobile device may take to preserve user data and abide by the network rules if the component cover was removed. While increasing the sampling rate, the processor may also determine if there is any unwritten data in a cache of the removable object(s) such as the SIM or the SD card. The processor of the mobile device may then ensure this information is flushed, so that the user may safely remove anything from the compartment without worrying about losing information.

Another optional step of the warning and preparatory method may be that the mobile device may display messages to the user on the display. The mobile device could warn the user of the removal of the component cover or could warn the user to wait before touching anything exposed.

Another feature that may run simultaneously throughout the process may be the sensor continuing to check for the replacement of the component cover. The sensor may continue to check for the detection portion at fixed or varying time intervals. If the sensor detects the return of the detection portion the warning and preparatory method may be stopped the method may return to sensing the presence of the cover 60.

The above-described embodiments are intended to be examples only. Those of skill in the art can effect alterations, modifications and variations to the particular embodiments without departing from the scope of this application.

What is claimed is:

1. A warning and preparatory method for a mobile device comprising:
   sensing removal of a component cover of the mobile device;
   determining active applications executing on the mobile device; and
   saving critical user and system data.

2. The warning and preparatory method of claim 1 wherein removal of the component cover is a trigger event for proceeding with the warning and preparatory method.

3. The warning and preparatory method of claim 1 wherein sensing removal of the component cover occurs at fixed time intervals.

4. The warning and preparatory method of claim 1 further comprising storing information relating to mobile device state.

5. The warning and preparatory method of claim 1 further comprising switching to powering via an alternative power source after sensing removal of the component cover.

6. The warning and preparatory method of claim 5 further comprising checking a power charge level of the alternative power source.

7. The warning and preparatory method of claim 1 further comprising saving unwritten data.

8. The warning and preparatory method of claim 1 wherein applications are paused, closed or ignored depending on their power consumption after determining the active applications.

9. The warning and preparatory method of claim 1 further comprising stopping the warning and preparatory method when replacement of the component is sensed.

10. A computer readable medium having recorded thereon statements and instructions for execution by a computer to carry out the method of claim 1.

11. The warning and preparatory method of claim 1 further comprising:
increasing a sampling rate of removable objects.

12. The warning and preparatory method of claim 1 further comprising, before sensing removal of the component cover, establishing a connection between the component cover and system ground.

13. The warning and preparatory method of claim 12 wherein sensing removal of the component cover comprises:
sensing connection between the component cover and system ground has been broken.

14. The warning and preparatory method of claim 1 further comprising, before sensing removal of the component cover, establishing a magnetic field between the component cover and a magnet.

15. The warning and preparatory method of claim 14 wherein sensing removal of the component cover comprises:
determining that the magnetic field has been broken.

16. The warning and preparatory method of claim 1 further comprising
sensing replacement of component cover; and
returning mobile device operation to a state prior to removal of component cover sensed.

17. The warning and preparatory method of claim 1 further comprising, before sensing removal of the component cover, establishing a connection between a radio frequency identification (RFID) sensor within the mobile device and an RFID tag within the component cover.

18. The warning and preparatory method of claim 17 wherein sensing removal of component cover comprises:
sensing connection between the RFID sensor and the RFID is broken or weakened.

19. The warning and preparatory method of claim 1 further comprising logging events based on sensing removal of component cover.

20. The warning and preparatory method of claim 1 further comprising, occurring after sensing removal of component cover, displaying error messages on the mobile device.

* * * * *